United States Patent [19]

Arfsten et al.

[11] Patent Number: 5,079,196
[45] Date of Patent: Jan. 7, 1992

[54] FIBER REINFORCED COMPOSITES AND PROCESS FOR MANUFACTURE

[75] Inventors: Nanning Arfsten, Ockenheim; Werner Kiefer; Wolfgang Pannhorst, both of Mainz; Hartmut Hegeler, Berlin; Christian Reich, Berlin; Rolf Brückner, Berlin, all of Fed. Rep. of Germany

[73] Assignee: Schott Glaswerke, Mainz, Fed. Rep. of Germany

[21] Appl. No.: 608,432

[22] Filed: Dec. 20, 1990

Related U.S. Application Data

[63] Continuation of Ser. No. 246,109, Sep. 19, 1988, abandoned.

[30] Foreign Application Priority Data

Sep. 19, 1987 [DE] Fed. Rep. of Germany ....... 3731650

[51] Int. Cl.$^5$ .............................................. C04B 35/02
[52] U.S. Cl. ...................................... 501/95; 428/113; 428/288; 427/185; 264/65
[58] Field of Search ................. 501/95; 264/DIG. 19, 264/65; 428/113, 288; 427/185

[56] References Cited

U.S. PATENT DOCUMENTS

| | | | |
|---|---|---|---|
| 4,256,378 | 3/1981 | Premo et al. | 350/310 |
| 4,314,852 | 2/1982 | Brennen et al. | 501/88 |
| 4,460,639 | 7/1984 | Chi et al. | 428/224 |
| 4,485,179 | 11/1984 | Brennan et al. | 501/32 |

FOREIGN PATENT DOCUMENTS 0214022 1/1990 Japan .

OTHER PUBLICATIONS

Rice, "Processing of Advanced Ceramic Composites", Natl. Res. Soc. Symp. Proc., vol. 32 (1984), Elsevier Pub. pp. 337–348.
Uhlmann, ed. *Glass: Science and Technology*, vol. 2, Academic Press (1984), pp. 219–220.
Walker et al., "Prep and Properties of Monolithic and Composite Ceramics Produced by Polymer Pyrolysis", *Ceramic Bulletin*, vol. 62(8), (1983), pp. 916–923.
Lannutti et al., "Sol-Gel Derived Coatings on SiC and Silicate Fibers Ceramic Engineering and Science Proceedings", 5 (1984), Jul.-Aug. No. 7/8.
Chemical Abstracts, 104:154468m (Maeda et al.).

*Primary Examiner*—Olik Chaudhuri
*Assistant Examiner*—Andrew Graffis
*Attorney, Agent, or Firm*—Millen, White & Zelano

[57] ABSTRACT

In a process for manufacturing fiber reinforced composites made or inorganic sinterable material and inorganic fibers the fibers are continuously passed through a bath which works acccording to the fluidized bed principle and which contains a solution of at least one metal alkoxide of the elements of the first to the fourth main groups of the periodic table and the forth and fifth subgroups of the periodic table, which solution already comprises products of hydrolysis and their condensation products, and the fibers moistened with the solution are wound one upon the other to form layers, the moistened and wound fibers are dried, the metal alkoxides on the fibers are completely hydrolyzed and the products of hydrolysis are polycondensated, and the layers of the fibers being adhered by the powder and the polycondensation products of the products of hydrolysis of the metal alkoxides are hot pressed.

28 Claims, 4 Drawing Sheets

FIBER REINFORCED COMPOSITES AND PROCESS FOR MANUFACTURE

This is a continuation of application Ser. No. 07/246,109 filed Sept. 19, 1988 now abandoned.

BACKGROUND OF THE INVENTION

1. Field of the Invention

The present invention relates to fiber reinforced composites made of inorganic sinterable material and inorganic fibers and a process for the manufacture thereof.

2. Description of the Prior Art

In search of materials suitable for heat resistant structural components which are especially used in aeronautics and astronautics, and engine and turbine manufacturing, one meets with limitations in developing alloy materials. On the one hand, it is difficult to achieve the desired heat resistance at temperatures above 800° C. On the other hand, for these materials, raw materials are required which are rare and expensive, so that the ratio of costs to yield becomes more and more unfavorable. Furthermore, since alloys on the basis of Fe, Ni and Co have a high specific weight and are often used in moving parts, there is beyond that a general interest in developing heat resistant materials with less specific weight.

As materials which can substitute for the alloys in the mentioned fields of application in principle ceramic materials are taken into consideration which excel by having low specific weight and superior temperature resistance under a great variety of atmospheres. In addition, these materials often possess a superior wear resistance as well as a good chemical resistance. Finally, the raw materials involved are available in a sufficient extent and moderately priced.

The fact that ceramic materials are rarely used in spite of these outstanding combinations of properties in the considered fields of application, is due to their typical brittle fracture behavior. The risk that a structural unit will suddenly break catastrophically is regarded as too high.

On grounds of this situation, for 20 years attempts have been made to reduce the brittleness of ceramic materials by the development of composites. In this connection, the development of fiber reinforced glasses and glass ceramics has become an important field of technology. Thereby, increases in bending strength and fraction toughness up to values of about 1000 MPa and 20 MPa×$\sqrt{m}$, respectively (m=meter) were achieved. The increase of the values of fracture toughness, which is of special significance for the reduction of the brittle fracture behavior, has resulted up to now mainly from experimental experience. The knowledge how fracture development influences the value of the fracture toughness is still lacking.

Up to now in the relevant literature two basically different methods for the manufacture of composites with a glassy or glass ceramic matrix, respectively, are known.

Two methods are suspension technique and the sol gel technique.

In case of the relatively simple, predominantly used suspension method, a matrix powder is mixed with a binder, mostly a mixture of alcohol(s) and a latex binder. The fibers are passed through the matrix/binder bath and thereby impregnated with matrix material, as was first described in 1972 (Sambell et al. (1972), J. Mat. Sci. 7, p. 676 to 681).

In U.S. Pat. No. 4,256,378, a mirror with particularly good properties made of a composite of C-fibers and borosilicate glass is described. The particularly good properties are especially the low relative deformation in extension and the specific rigidity. The production proceeds via the production of a prepreg. Generally, a prepreg is a half finished layer of a multitude of fibers being impregnated with matrix material and being deposited side-by-side in mutual contact with each other. Also a few fiber layers can be deposited one upon the other by passing the C-fibers through a suspension consisting of glass in propanol or glass in propanol, polyvinylalcohol and a wetting agent. Densification of the prepreg is performed by hot pressing under vacuum or an argon protective gas atmosphere at temperatures of 1050° to 1450° C. and pressures between 6.9 and 13.8 MPa. Burning out of binders is not necessary. However, the solvents do not contribute to the properties of the composite material. With respect to a bidirectional reinforced material in a three point transverse bending test, bending strengths up to 387 MPa are described. In a later publication, obviously as a result of process optimization, in a three point transverse bending test bending strengths up to 520 MPa for 35 vol. % SiC-fibers and up to 840 MPa for 50 vol. % SiC-fibers are reported (K. M. Prewo, J. J. Brennan, J. Mat. Sci. 17 (1982), pp. 1201).

In U.S. Pat. No. 4,314,852, the manufacture of composite materials made of SiC-fiber reinforced glasses is described. As glasses, a borosilicate glass, an alkaline earth aluminosilicate glass and a high silica content glass are quoted. The production proceeds via two process steps which are, except for modified amounts of single components, identical with those described in U.S. Pat. No. 4,256,378. With respect to the composite materials very good thermomechanical properties are obtained. With respect to the SiC-fiber reinforced borosilicate glass (SiC-fibers from Nippon Carbon Company, Japan), at room temperature bending strengths of just under 500 MPa for unidirectional and 350 MPa for bidirectional reinforcement are observed. The room temperature bending strength values of SiC-fiber reinforced alkaline earth aluminosilicate glass with a fiber loading of 50 vol. % are about 1000 MPa for bidirectional and just 1400 MPa for unidirectional reinforcement. With respect to the SiC-fiber reinforced high silica content glass, the bending strength values at a fiber loading of 30 to 40 vol. % are between 400 and 550 MPa. With respect to the SiC-fiber reinforced alkaline earth aluminosilicate composites, fracture toughnesses of 16 MPa×$\sqrt{m}$ for bidirectional and 27 MPa×$\sqrt{m}$ for unidirectional reinforcement are reported.

In U.S. Pat. No. 4,485,179, the manufacture of composite materials made of SiC-fiber reinforced glass ceramics is described. As a preferred matrix material, the starting glass (precursor glass) of a $Li_2O$—$Al_2O_3$—$SiO_2$-glass ceramic with $Nb_2O_5$, $Ta_2O_5$ and $ZrO_2$ as nucleation agents is quoted. The production process proceeds as described in U.S. Pat. No. 4,256,378, the suspension consisting of glass, water and latex binder which has to be burned out prior to hot pressing. The conversion of the starting glass (precursor glass) into a glass ceramic can take place either during hot pressing or during an additional temperature treatment. As a particularly important result of material selection, the use of $Nb_2O_5$ and/or $Ta_2O_5$ is emphasized because during the production process NbC or TaC layers, respectively, form on the fibers at the interface. These layers prevent further reaction between the fibers and the matrix at high temperatures and under oxidative conditions. Furthermore, it is stated that the use of $TiO_2$, which is preferably used as nucleation agent in $Li_2O—Al_2O_3—SiO_2$-glass ceramics, should be completely avoided or at least only used in very small amounts. This is due to the fact that $TiO_2$ also reacts with SiC-fibers from which, contrary to the reactions between SiC and $Nb_2O_5$ or $Ta_2O_5$, a strong degradation of the SiC-fiber properties results. With respect to composite materials with a fiber loading of 50 vol. %, in a three point transverse bending test at room temperature bending strengths of at most just under 1000 MPa are obtained. Fracture toughnesses are not measured, but values above 11 MPa$\times\sqrt{m}$ are expected.

The EP 0 126 017 represents a further development of U.S. Pat. No. 4,485,179, in that excellent bending strengths and a good oxidation resistance up to temperatures of 1200° C. are achieved by utilization of another matrix material. The improvements are obtained by using a Ba-modified cordierite or a Ba-osumilite glass ceramic, respectively, instead of the $Li_2O—Al_2O_3—SiO_2$-glass ceramic. Powders of the corresponding starting glasses are used as matrix materials, while the conversion of the glass into glass ceramics either takes place during or after hot pressing. As nucleation agents $Na_2O_5$ and/or $Ta_2O_5$ are again used because of their positive effect on the formation of an interface fiber/matrix. At room temperature in a three point transverse bending test bending strengths up to 700 MPa are measured. In especially one example (number 4) wherein a Ba-osumilite glass ceramic matrix is employed, a linear run of the stress strain curve is obtained which is explained by the fact that the matrix has completely crystallized.

The manufacture of fiber reinforced glass ceramics on the basis of stoichiometric cordierite has as yet not been described. Presumably, this is due to the strong tendency of the powders of the starting glasses to crystallize just above the transformation temperature and also due to the difficulties during condensation which result therefrom.

In the state of the art here described as well as in other publications, the suspension bath mostly works according to the fluidized bed principle, as it has been described by Bowen et al. in 1969 (Brit. Pat. Spec. 1,279,252).

Compressed air is injected into the suspension to prevent sedimentation of the powder and to expand the fiber bundles so that they are also impregnated with matrix material in the interior thereof.

The NASA Contr. Reports 158 946 (1978) and 165 711 (1981) mention the addition of 2% LUDOX ® (Trademark of Du Pont) to the binders already described, i.e., the addition of colloidal $SiO_2$ which leads to an increase in strength.

If binders are used in the above described process, they have to be burnt out after the preparation of the fibers and prior to prepreg densification by means of hot pressing. This means an additional process step. Furthermore, there is a risk that [rests] residues of "alien" binders will remain and contaminate the material. In the case where alcohol is used as the sole binder, the adhesion of the powder to the fibers is poor after its evaporation. This can lead to matrix losses by part of the matrix material dropping off the fibers.

A second method which is quoted in the literature, the sol-gel-technique, is described in the following publications:

Walker et al., Am. Cer. Soc. Bull. 62 (8) (1983), pages 916 to 923;

Rice, Mat. Res. Soc. Sym. Proc. Vol. 32 (1984), pages 337 to 345;

Lannutti, Clark, ebd, pages 369 to 375; and

Lannutti, Clark, ebd, pages 375 to 381.

In this method, the reinforcing fiber is either passed through a sol gel solution of matrix material and then wound up, or it is laid up dry and subsequently impregnated with solution during the course of which the impregnating process can be performed several times.

If composites are to be formed which are non-porous and free of cracks, the partly protracted and complicated drying process of the prepreg (hydrolysis, pyrolysis) represents a disadvantage of this method. High volume shrinkage of the solution is the main problem of the method. In converting the sol into the gel state, the vaporization of the alcohols, normally present in the solution, becomes more and more difficult. If the fibers are laid up wet, there is a risk that in continuously processing the fibers the solution will start to hydrolyze, due to atmospheric moisture, resulting in changes in viscosity.

If the protracted drying process should be avoided, hot pressing can be used for final densification as described by:

Haluska, European Pat. Appl. 0 125 772 (1984);

Fitzer, Schlichting, High Temp. Sci. 13 (1980) pages 149 to 172;

Fitzer, Proc. Int. Fac. in Densification and Sintering of Oxide and Non-Oxide Cer., 1978, Japan; and Schubert, Diss., University Karlsruhe (1977).

BRIEF SUMMARY OF THE INVENTION

An object of the present invention is to provide a composite in which the adhesion between fiber and matrix can be optimally adjusted; especially, to provide a process by which such a composite can be fabricated more easily than by known processes.

Upon further study of the specification and appended claims, further objects and advantages of this invention will become apparent to those skilled in the art.

These objects are achieved by providing a process for manufacturing fiber reinforced composites made of inorganic sinterable material and inorganic fibers comprising the steps of: passing the inorganic fibers continuously through a suspension of inorganic sinterable silicate powder in a fluidized bed; winding the fibers, moistened with the suspension, one upon another in layers; drying; and hot pressing the layers of fibers; characterized in that a suspension is used which contains, to promote the adhesion between the fibers and the inorganic material, a solution of at least one metal alkoxide, which solution already comprises products of hydrolysis as well as their polycondensation products, and that the metal alkoxides are completely hydrolyzed on the fiber and the inorganic material, and the products of hydrolysis are polycondensated, in course of which surface layers are formed on the fiber and the inorganic material which, on the one hand, facilitate the sintering process and hot pressing due to their high reactivity, and, on the other hand, act as a reaction barrier between fiber and inorganic material.

In the inventive process, by manufacturing fiber reinforced glasses and glass ceramics, fibers are coated with a binder and glass powder by being continuously passed through a suspension. The suspension contains a powder of glass and a sol gel solution. The glass powder forms the matrix of the fiber reinforced material and the sol gel solution acts as a binder and promotes the adhesion between the fiber and the matrix material as well as between the individual powder particles of the matrix material. The fibers being impregnated in this way are wound up on a drum to form a layer package which is subsequently subjected to hydrolysis and polycondensation of the sol. Densification of the resultant prepreg takes place during hot pressing.

In the inventive composite adhesion between fibers and matrix can be adjusted to obtain an optimal adhesion. The inventive process especially renders such adjustment possible in that the composition of the matrix material as well as of the sol gel solution can be varied within wide ranges and can be reconciled with each other.

Besides adjusting the adhesion between the fibers and the matrix, the sol gel solution can simultaneously serve as a reaction barrier between the matrix and the fibers. This is because the sol gel solution covers the fibers as well as the glass or glass ceramic powder.

DETAILED DESCRIPTION OF THE INVENTION

According to the invention, the alkoxides of the elements of the first to the fourth main group (groups Ia–IVa), as well as the fourth and the fifth sub groups (groups IVb and Vb) of the periodic table can be used alone or in combination. The alkoxides of sodium, potassium, magnesium, calcium, barium, aluminum, silicon, titanium, zirconium, hafnium and tantalum especially can be used.

The following statements concerning silicic acid ester also apply to the other metal alkoxides which are suitable for the present invention.

The disadvantages of the suspension method, such as either the poor adhesion of the powder to the fiber or the necessity of burning out the binders, and those of the sol gel method, high volume shrinkage and very protracted processing times, can be overcome by mixing defined anhydrolyzed silicic acid esters with a glass powder mixture and subsequently coating them on the SiC fibers. The anhydrolyzed silicic acid esters simultaneously act as a "chemical coupler" between the individual glass powder particles and as an adhesion agent for the fibers. In particular, the polycondensation of the utilized silicic acid esters, especially silicic acid tetramethyl- or -ethylester, decisively influences the coating ability, because both materials, fiber and matrix, have to be moistened by this solution. It has become apparent that the viscosity of the utilized sol gel solution has to be in the range of 2.0 to 2.4 cSt to achieve a good moistening of the glass powder particles and the SiC fibers. The coating thicknesses are determined, on the one hand, by the velocity with which the fibers are passed through the bath, and, on the other hand, by the adjusted viscosity of the coating solution. A particular advantage of the utilized sol gel solution is the possibility of adjusting the solution to be hydrophobic or hydrophilic.

In the following, the production of a sol gel solution is described by means of the example of silicic acid tetramethyl ester. The utilized sol gel solutions are prepared prior to admixing the glass powder particles as follows: silicic acid tetramethyl ester is mixed with distilled water and acetic acid (glacial acetic acid) in a ratio of 1:1–10:1–3. The velocity of hydrolysis is determined by the concentration of water and acetic acid, but can also, with a great variety of solvents, by advantageously controlled by the degree of dilution. As a rule lower alcohols such as methanol, ethanol, n-propanol, i-propanol, n-butanol, etc., ketones such as acetone, methyl ethyl ketone, etc., and carboxylic acid esters such as methyl acetate, ethyl acetate, butyl acetate, etc., are used.

The hydrolysis firstly takes place in concentrated solutions, the degree of dilution approximately corresponding to a ratio of silicic acid ester to solvent of 1:1–10. After hydrolysis, the viscosity of such a concentrate is between 2.4 and 3.2 cSt. Subsequently, the concentrate is diluted with the selected solvent until the viscosity is between 2.0 to 2.4 cSt. Glass powder particles are admixed to this sol gel solution in such an amount that the weight ratio of inorganic sinterable silicate powder and solution is in the range of 1:5 to 1:1. A particular advantage of the described sol gel solution is its ability to be used for a time period of up to three months.

By adapting the sol gel solution to the chemical composition of the glass powder being utilized, it is possible, especially by controlling the reactivity of the sol gel solution via the degree of hydrolysis of the silicic acid ester, and by the possible use of polar-nonpolar, protic-aprotic solvents, and mixtures thereof, to optimize the bonding between the fiber and the glass powder. This means that, by chemically varying the sol gel solution, specified surfaces can be produced which are adapted to the fibers as well as to the glass powder particles and establish contact between the fibers and the glass powder particles. These surfaces lead to an essential improvement in the bonding between the glass powder particles and the fibers.

After the fiber has been passed through the suspension, it is wound onto a drum. In the course of which, the threads are laid up side-by-side. Several layers are then laid one upon another to achieve thicker prepregs. To obtain a homogeneous distribution between the fibers and the matrix, the amount of adhering glass is regulated by a squeezing device.

After the winding process, the prepreg is removed from the drum. The anhydrolyzed solution is completely hydrolyzed by a temperature treatment at 20° to 250° C. and an atmospheric moisture of 10 to 13 g/m$^3$. Subsequently, the final oxide layer is formed by a temperature treatment at 250° to 450° C. in 0.05 to 24 hours.

After these process steps, a prepreg is obtained which is quite strong and, hence, can be subsequently well worked. The cylindrically shaped prepreg is cut into planar prepregs. Subsequently, the prepregs are optionally either immediately hot pressed, or they are stacked to obtain thicker specimens. The individual layers can be oriented in the same direction to obtain unidirectional reinforcement, or they can be oriented in different directions to obtain a more or less isotropic reinforcement.

After inserting the prepreg layers into the hot press, hot pressing proceeds in several process steps. Firstly, the specimen is heated up to the glass transition temperature, $T_g$, under vacuum. Approximately at $T_g$ of the glass, the press die is layed upon the specimen leading to a pressure of approximately 0.2 MPa. Subsequently, the specimen is heated up to the pressing temperature either under vacuum or a protective gas atmosphere. Depending on the high reactivity of the sol gel and upon the crystallization tendency of the matrix glass, a more or less strong densification occurs during heating up in the course of which in some matrix material/sol gel combinations two thirds of the final densification is achieved. At the press temperature, which for the materials used according to the invention is between 1150° and 1400° C., the densification takes place, in the course of which press pressures up to 10 MPa and press times of 5 to 10 min. are sufficient in most cases. Thus, lower pressures and shorter press times (at comparable temperatures) compared to the suspension method can be used. According to current knowledge this is due to the high reactivity of the sol gel which covers each fiber and each matrix grain. The sol gel has a double function in this process step, insofar as it protects, on the one hand, the fiber from a possible destabilizing reaction between the fiber and the matrix or the fiber and the atmosphere, and, on the other hand, shortens the process times. The importance of the second point is due to the fact that some fibers, especially the SiC fibers, are unstable independently from the atmosphere at temperatures of approximately 1300° C. and more (see for example A. S. Fareed et al., Amer. Cer. Soc. Bull., 66 (1987), pages 353 to 358), and thus should be subjected to these temperatures for as short a time as necessary.

The invention process has the following advantages.

No alien binders in the form of waxes, moistening agents, etc. are used so that the step of burning out these materials is omitted and the risk that contaminating residues remain in the prepreg is eliminated. A uniform distribution of powder bonded to the fibers is achieved even without the binding agents mentioned above by the adjustable bonding forces between the matrix and the fiber. Due to this bonding, the problem of homogeneously embedding the fibers is reduced to precisely controlling the winding procedure, i.e., merely a technological problem. The good homogeneity of the prepreg is not lost even when sawing through with a diamond saw; no matrix loss and no local enrichment arises. Compared with the sol gel technique, the inventive process has the advantage that the sol gel contributes only a small volume portion to the matrix material in which the fibers are embedded, because the matrix is formed by the glass powder. The strong shrinkage of the sol during hydrolysis and polycondensation is thus only of minor importance with respect to the inventive composite.

The compatibility of the fiber and the matrix is increased by coating both components with a sol gel solution, even if the fiber and the matrix material are not very compatible. Hence, in most cases it is not necessary to cover the fibers with a protective coating. Also the process atmosphere during hot pressing is not limited by a possible reaction between the fiber and the process atmosphere. The "Gründichte" (density of the prepreg) is higher in comparison to other methods which use alien binders and/or alcohols, because the sol gel contributes to the material in which the fibers are embedded.

Due to the high reactivity of the surface of the condensed sol, hot pressing is facilitated and can take place at lower temperatures.

The inventive process is largely independent from the materials mentioned and thus allows the use of a wide range of glasses for manufacturing composites. In the manufacture of composites, the properties thereof can be directly varied, and an adaption of the glass to the fiber material is possible by selecting the composition of the sol gel solution as well as the glass composition. Optimization of especially such properties as strength, fracture toughness, thermal expansion, etc., can be carried out more quickly and are more easily surveyed. By the sole use of a pure anhydrolyzed silicic acid ester, for example, the $SiO_2$ content of the glassy material in which the fibers are embedded is increased and in this way an increase in the glass transition temperature is observed. In addition, the decrease which occurs in bending strength at higher temperatures is shifted to higher values.

Also all types of inorganic fibers comprising SiC, $Si_3N_4$, $Al_2O_3$, $ZrO_2$, $SiO_2$, mullite and/or C as main components, and optionally Si, Ti, Zr, Al, C, O, N as additional components, such as, for example, SiC—, SiC—$Si_3N_4$—, $Si_3N_4$—, $Al_2O_3$—, $ZrO_2$—, mullite and C-fibers can be used. Moreover, ceramizing of the glass can take place after hot pressing or during hot pressing in a glass ceramic.

With the inventive process, composite materials can be produced with properties which clearly excel the prior art. With respect to SiC fiber reinforced borosilicate glass produced by use of a $SiO_2$-containing sol gel solution, for example, with unidirectional reinforcement and a fiber volume loading of 40%, bending strengths up to 800 MPa are observed in a three point transverse bending test. The fracture toughness values amount to 20 $MPa \times \sqrt{m}$. In measuring stress strain diagrams, the linear portion of the stress strain curve extends nearly up to the ultimate strength. This has not been observed up to now with comparable composite materials, and thus attracts attention. Probably, this is due to, among other things, the formation of the $SiO_2$-containing interface between matrix and fiber.

In the production of SiC fiber reinforced alkaline earth aluminosilicate glasses by use of $SiO_2$-containing sol gel solutions, not only high bending strengths of, for example, approximately 1300 MPa are achieved, but also high fracture toughnesses of, for example, 36±7 $MPa \times \sqrt{m}$ which clearly excel the prior art. Since the increase in fracture toughness is itself an essential aspect of material development, values of 36 $MPa \times \sqrt{m}$ and more represent clear progress in comparison to the prior art in which values of maximally 27 $MPa \times \sqrt{m}$ are stated.

Furthermore, the inventive process allows production of fiber reinforced glass ceramics on the basis of stoichiometric cordierite. The difficulties in densification previously mentioned which result from the strong crystallization tendency of the powders of the starting glasses are overcome by use of the sol gel solutions. Also, the properties obtained reach up to the values achieved by SiC fiber reinforced borosilicate glasses.

While the best mechanical properties in using alkaline earth aluminosilicate glasses as matrix material are achieved with SiC fiber reinforcement, with C fiber reinforcement the best values are observed with borosilicate glasses and $B_2O_3$-modified alkaline earth aluminosilicate glasses as matrix material. In both cases, maximal bending strengths above 1200 MPa are achieved. The maximal fracture toughnesses are approximately 35 $MPa \times \sqrt{m}$ with respect to the borosilicate glass and approximately 25 $MPa \times \sqrt{m}$ with respect to the $B_2O_3$-modified alkaline earth aluminosilicate glass.

The following are examples of glasses suitable for use as the matrix material:

1. borosilicate glass having the following physical properties:

| | |
|---|---|
| Density | = 2.23 g/cm$^3$ |
| Expansion coefficient $a_{20-300}$ | = 3.25 × 10$^{-6}$K$^{-1}$ |
| Modulus of elasticity | = 63 kN/mm$^2$ |
| Dielectric constant at 1 MHz | = 4.7 |
| Loss angle tan δ at 1 MHz | = 55 × 10$^{-4}$ |
| Transition temperature $T_g$ | = 530° C. |
| Working temperature at 10$^4$ dPa · s | = 1270° C.; and |

2. P$_2$O$_5$-containing alkaline earth aluminosilicate glass with the following physical properties:

| | |
|---|---|
| Density | = 2.56 g/cm$^3$ |
| Expansion coefficient $a_{20-300}$ | = 4.1 × 10$^{-6}$K$^{-1}$ |
| Modulus of elasticity | = 90 kN/mm$^2$ |
| Dielectric constant at 1 MHz | = 6.1 |
| Loss angle tan δ at 1 MHz | = 23 × 10$^{-4}$ |
| Transition temperature $T_g$ | = 730° C. |
| Working temperature at 10$^4$ dPa · s | = 1235° C. |

The following are examples of fiber reinforced composites according to the invention:

1. a composite of borosilicate glass as matrix material with the physical properties:

| | |
|---|---|
| Density | = 2.23 g/cm$^3$ |
| Expansion coefficient $a_{20-300}$ | = 3.25 × 10$^{-6}$K$^{-1}$ |
| Modulus of elasticity | = 63 kN/mm$^2$ |
| Dielectric constant at 1 MHz | = 4.7 |
| Loss angle tan δ at 1 MHz | = 55 × 10$^{-4}$ |
| Transition temperature $T_g$ | = 530° C. |
| Working temperature at 10$^4$ dPa · s | = 1270° C. | and a SiC fiber loading of about 42-54 vol. %; the matrix material as well as the fibers are covered by a binding agent layer obtained by thermal hydrolysis and polycondensation of at least one silicic acid ester; and the composite has a bending strength of about 671-921 MPa and a fracture toughness of about 16-27 MPa×√m;

2. a composite of P$_2$O$_5$-containing alkaline earth aluminosilicate glass as matrix material with the physical properties:

| | |
|---|---|
| Density | = 2.56 g/cm$^3$ |
| Expansion coefficient $a_{20-300}$ | = 4.1 × 10$^{-6}$K$^{-1}$ |
| Modulus of elasticity | = 90 kN/mm$^2$ |
| Dielectric constant at 1 MHz | = 6.1 |
| Loss angle tan δ at 1 MHz | = 23 × 10$^{-4}$ |
| Transition temperature $T_g$ | = 730° C. |
| Working temperature at 10$^4$ dPa · s | = 1235° C. | and a SiC fiber loading of about 45 vol. %; the matrix material as well as the fibers are covered by a binding agent layer obtained by thermal hydrolysis and polycondensation of at least one silicic acid ester; and the composite has a bending strength of greater than about 1200 MPa and a fracture toughness of up to 43 MPa×√m;

3. a composite of borosilicate glass as matrix material with the physical properties:

| | |
|---|---|
| Density | = 2.23 g/cm$^3$ |
| Expansion coefficient $a_{20-300}$ | = 3.25 × 10$^{-6}$K$^{-1}$ |
| Modulus of elasticity | = 63 kN/mm$^2$ |
| Dielectric constant at 1 MHz | = 4.7 |
| Loss angle tan δ at 1 MHz | = 55 × 10$^{-4}$ |
| Transition temperature $T_g$ | = 530° C. |
| Working temperature at 10$^4$ dPa · s | = 1270° C. | and a C fiber loading of about 30-50 vol. %; the matrix material as well as the fibers are covered by a binding agent layer obtained by thermal hydrolysis and polycondensation of at least one silicic acid ester; and the composite has a bending strength of about 634-1328 MPa and a fracture toughness of about 17-39 MPa×√m; and 4. a composite of B$_2$O$_3$-containing alkaline earth aluminosilicate glass as matrix material and a loading of about 42 vol. % C fibers which have a tensile strength of up to 7000 MPa and a modulus of elasticity of approximately 300 GPa; the matrix material as well as the fibers are covered by a binding agent layer obtained by thermal hydrolysis and polycondensation of at least one silicic acid ester; and the composite has an average bending strength of about 1200 MPa and an average fracture toughness of about 19 MPa×√m.

Independently from the inorganic fibers matrix materials, and sol gel compositions used, with the inventive process high fiber volume loadings up to 65% can be reached while the mechanical properties remain constantly good.

From this outline it follows that in using a sol gel solution as an additional component in a suspension solution the optimization of the fiber reinforced glasses and glass ceramics is decisively improved. The conversion of the solution surface layers on the matrix material and the fibers into coatings during the production process renders the production of protective coatings for the fibers largely superfluous.

The glasses and glass ceramics, fibers and sol gel solutions herein described have only an exemplary character. It is self-evident that for one of ordinary skill in the art, a multitude of further combinations for manufacturing fiber reinforced composites according to the present invention are possible.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications cited above and of corresponding German application P 37 31 650.8 (the priority document), are hereby incorporated by reference.

DETAILED DESCRIPTION OF PREFERRED EMBODIMENTS

Figure 1:
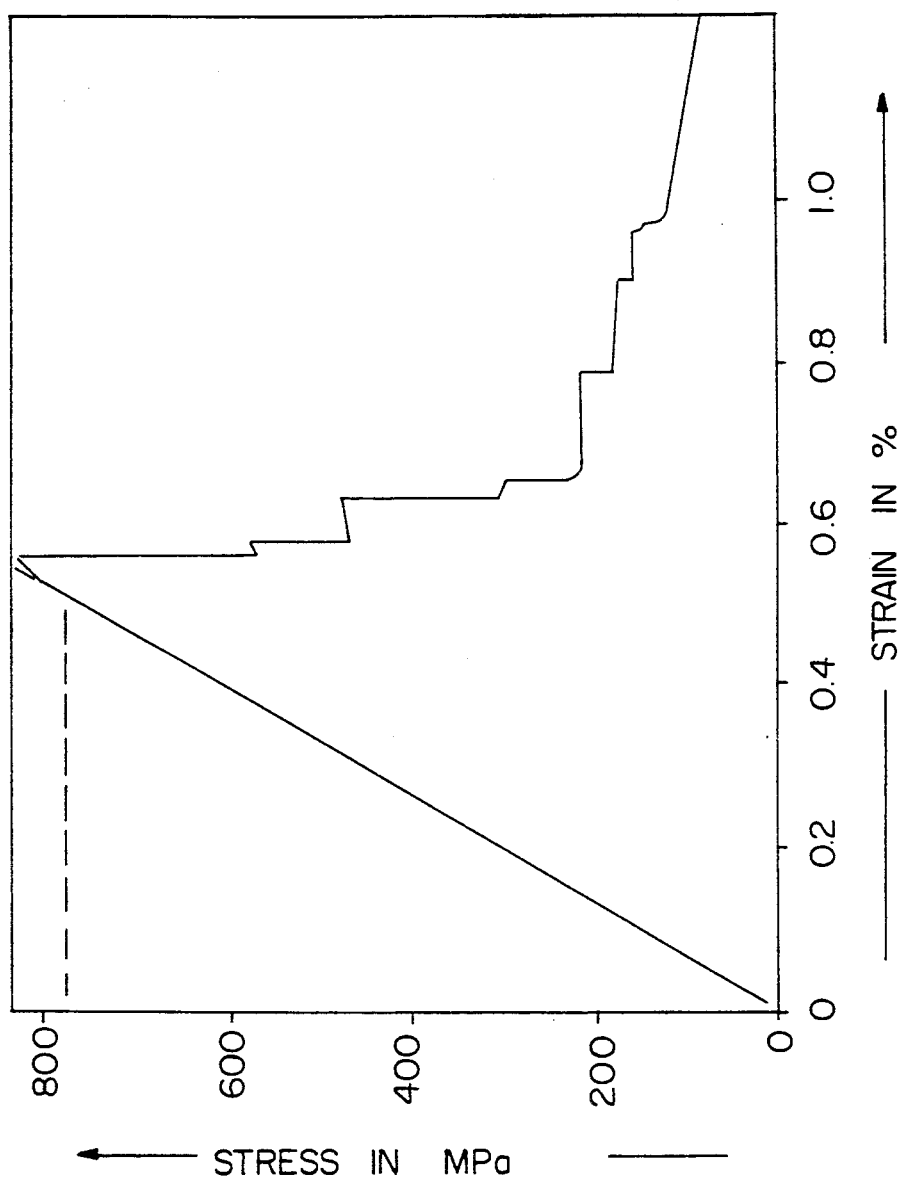
FIG. 1 shows the stress strain diagram of a SiC fiber reinforced borosilicate glass manufactured by use of a SiO$_2$-containing sol gel solution (DURAN/SiC-composite; fiber-loading 40±2 vol. %)

In the table several different inventive fiber reinforced composites with different compositions and their mechanical properties are listed. For these examples, SiC fibers from Nippon Carbon Company, Japan, and C fibers, T 800 and T 1000, from Torayca, Japan, are used as fiber materials. T 800 is a fiber with a tensile strength of approximately 5800 MPa, a modulus of elasticity of approximately 300 GPa and an ultimate strain of 1.9%. The C fiber with the name T 1000 has the same modulus of elasticity and a tensile strength of 7000 MPa. As matrix materials, glasses and glass ceramic starting glasses of Schott Glaswerke, Mainz, were utilized. Specifically, the borosilicate glass DURAN® with the type number 8330, the $P_2O_5$-containing alkaline earth aluminosilicate glass SUPREMAX with the type number 8409, a $B_2O_3$-containing alkaline earth aluminosilicate glass with the type number 8252, the starting glass GM 30870 for a stoichiometric cordierite glass ceramic as well as a 3 wt. % Ba- and a 3.5 wt. % $TiO_2$-containing GM 30870 glass are used. The sol gel solutions were selected to form $SiO_2$-, $TiO_2$- or DURAN glasses. In synthesizing of the multicomponent glass DURAN, the alkoxides of the single elements are used in matching amounts. The single alkoxides can be admixed in an arbitrary sequence and then, as described in connection with the $SiO_2$ sol gel, converted into an oxide glass, which has the properties of conventionally produced DURAN glass, in an analogous way by joint hydrolysis, polycondensation and temperature treatment.

In the following, the inventive process is described in detail with respect to three different composite compositions from the table (examples 1, 10 and 24).

EXAMPLE 1

The production of a composite of DURAN glass with embedded SiC fibers as reinforcement components is described.

For the production of the prepreg, the fibers, in the state they were supplied (provided with a facing), are continuously removed from the supply drum and passed through a tube furnace (temperature 600° C.) to burn off the facing. Subsequently, the fiber bundle is guided via guide rollers into the fluidized bed, in which the glass powder/sol gel bath is located. The compressed air injected into the bath from below serves two purposes:

a) to prevent sedimentation of the glass powder in the solution;

b) to expand the fiber bundle consisting of approximately 400 monofilaments by the flow and thus rendering possible an intimate impregnation of the bundle with matrix material.

Excess suspension is retained by a squeezing device and recycled to the fluidized bed.

An example of the composition of the suspension is a mixture of 100 g glass powder (grain size <40 μm) and 250 g sol gel solution on the basis of a $SiO_2$ composition.

The anhydrolyzed silicic acid tetramethyl ester containing sol gel solution is in a way stabilized. It has an almost constant viscosity over a time period of three months at room temperature.

The coated fibers guided by controls are laid up side-by-side on a drum being made of teflon. The drum has a hexagonal cross-section to obtain plane prepregs being as large as possible with minimal material losses and minimal fiber bending. The fiber bundles impregnated with matrix material remain on the winding drum till dry. When the desired dryness is obtained, the fiber bundles are removed and stored for 24 h at 80° C. and an atmospheric moisture of 10 to 13 g/cm³ till complete hydrolysis of the sol has taken place. The subsequent polycondensation takes place at 250° C. also over a time period of 24 h. The finished prepregs are sawn by a diamond saw to the format needed for hot pressing.

Hot pressing of the specimens takes place at 1200° C. and a press pressure of 10 MPa. The pressing time is 5 min. Pressing takes place under nitrogen atmosphere.

The determination of the expansion coefficient $\alpha$ in fiber direction yielded for $\alpha_{20/300}$ a value of $1.6 \times 10^{-6} K^{-1}$ and for $\alpha_{20/600}$ a value of $2.2 \times 10^{-6} K^{-1}$. DURAN glass has an expansion coefficient $\alpha_{20/300}$ of $3.25 \times 10^{-6} K^{-1}$. The dilatometer curves of the composites showed merely a weak bending at approximately 620° C. Consequently, the bending is 90° C. above $T_g$ of the pure glass matrix ($T_g$ of DURAN: 530° C.). The lowering of the expansion coefficient and the increase of $T_g$ of the composite are explained by the increased $SiO_2$ content which is due to the sol gel solution.

EXAMPLE 10

The described process can also be used to produce a composite with a matrix consisting of SUPREMAX and the reinforcement component being again continuous SiC fibers.

The fabrication of the prepreg proceeds according to example 1, also using a mixture of 100 g glass powder (grain size <40 μm) and 250 g sol gel solution as the composition of the suspension.

The prepregs are hot pressed at 1250° C. The pressure amounts to 5 MPa, and the pressing time is 5 min. The hot pressing process is performed under nitrogen atmosphere.

EXAMPLE 24

As the matrix component, the stoichiometric cordierite glass GM 30870 is used for infiltration of the SiC fiber bundle a suspension of a mixture of 100 g glass powder (grain size <40 μm) and 300 g sol gel solution is used.

The production of the prepreg proceeds again according to example 1. The hot pressing process differs from that of examples 1 and 10 and involves the following steps. Firstly, the specimen is heated up to 850° C. without applying pressure. After applying a pressure of 2 MPa, the temperature is increased up to 1310° C. At that temperature, the pressure is further increased up to 5 MPa for a time period of 5 min. The conversion of the glass into the glass ceramic takes place during heating up to the maximal temperature.

The mechanical properties, i.e., bending strength and fracture toughness of the three composites, the production of which is described above in detail, are listed in the table together with other preferred embodiments of the invention which had been manufactured with equivalent procedures.

The examples 6 and 8 in the table are not covered by the teachings of the present invention. Example 6 was produced with a prior art process to show the superior properties of the inventive composites by comparison. Example 8 serves to demonstrate the effect of the reaction barrier between the fiber and the matrix and, due to its very low mechanical strength is not to be reckoned among the inventive composites.

The bending strengths in the table were mostly measured with a three point transverse bending test. Specimens with the following dimensions were used: length 90 to 100 mm, width 3.5 to 8 mm, and height 2.5 to 3.5 mm; the span between the supports was in the range of 75 to 80 mm, the ratio of support span/height always being larger than 18. In examples 1, 10 and 24, four point bending strengths were measured. In these cases, rods with the dimension $43.0 \times 4.6 \times 3.5$ mm$^3$ were used; the inner and the outer spans were 20 and 40 mm, respectively.

The measurement of the fracture toughnesses was carried out with the same experimental arrangement, though notched rods with 1 to 2 mm deep notches, depending on the sample height, and of 100 $\mu$m width were used. The calculated standard deviations are based on a series of measurements with five individual measurements in each case.

Referring to the following table, the examples are explained in detail.

The first nine examples relate to SiC fiber reinforced DURAN. Examples 1 and 2 show that very high strengths can be obtained as well at room temperature as at 600° C. In comparing examples 1 and 2 with the following examples and the prior art, one should keep in mind that the values listed in the table for examples 1 and 2 refer to four point bending strengths which are generally lower than three point bending strengths. A typical stress strain diagram for example 1 is shown in FIG. 1. A comparison of Examples 1 and 3 shows that the pressing temperature is uncritical for the production of the composites. With respect to the material combinations selected in this case, it can be varied within a relatively wide range without substantially changing the properties. Examples 3 and 4 show that the bending strengths increase with an increase in fiber volume loading. At a fiber volume loading of 48% maximal strengths above 920 MPa are observed which clearly excel the prior art. In further increasing the fiber volume loading up to 54% the strengths drop again a little, while the average fracture toughness increases from 20 MPa$\times \sqrt{m}$ up to 25 MPa$\times \sqrt{m}$. The fracture toughnesses of the composite combinations SiC fiber/borosilicate glass, here reported, clearly excel the prior art. The drop in strength values when fiber volume loading increases from 48% to 54% in example 5 is, according to the current knowledge, due to the threads being laid up nonuniformly during the winding procedure.

As described in the prior art, in example 6 a suspension being free of binders is used which contains propanol instead of the SiO$_2$ sol gel solution as suspension solvent. In production of the composite the glass powder adheres relatively poorly to the fibers, so that an unhomogeneous embedding of the fibers is to be expected. This is also shown by the bending strengths which are on the average lower than the values of the comparable inventive composites and are strongly scattered as reflected in the standard deviation of 127 MPa.

Figure 2:
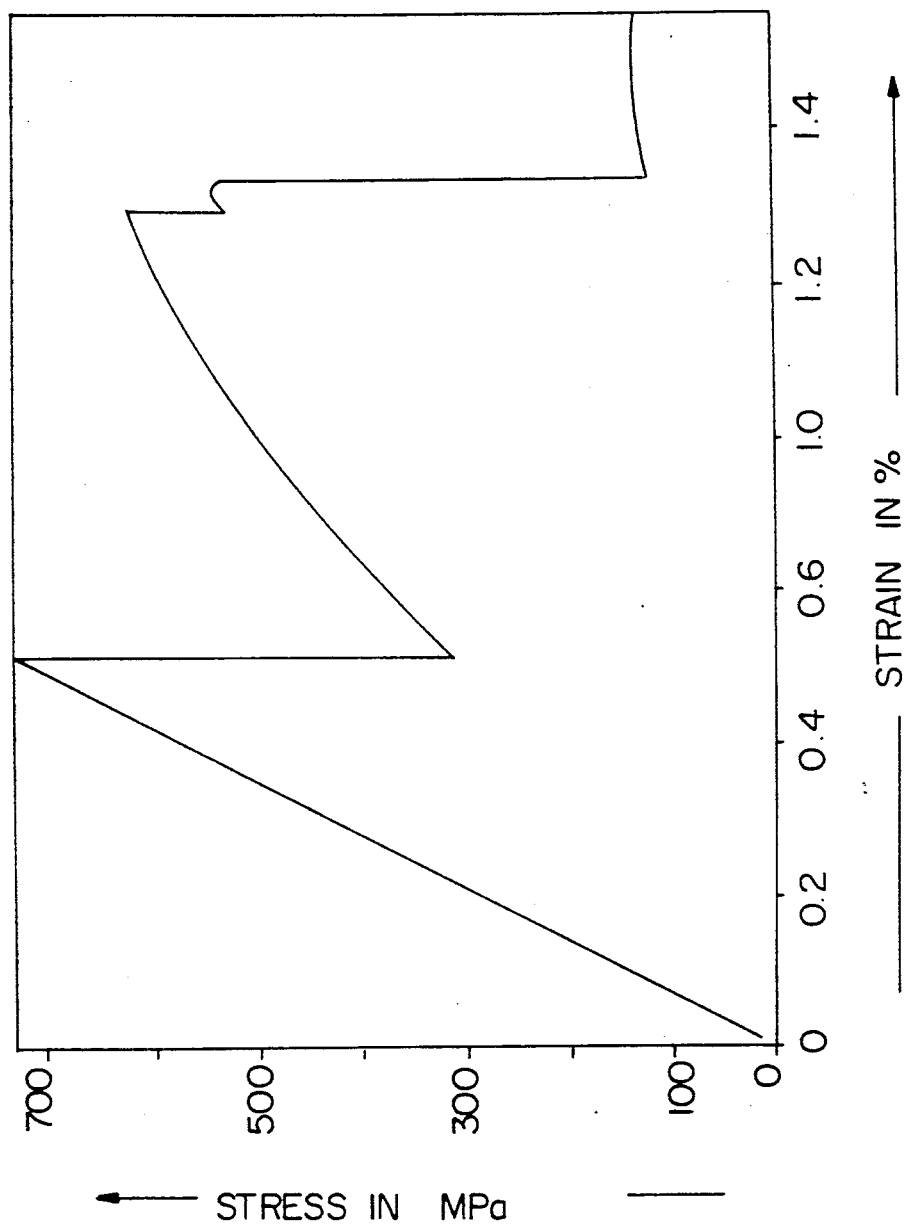
FIG. 2 shows the stress strain diagram of a SiC fiber reinforced borosilicate glass manufactured by use of a DURAN-containing (DURAN ®: borosilicate glass of Schott Glaswerke, Mainz, Federal Republic of Germany) sol gel solution (fiber-loading 40±2 vol. %)

The comparison of examples 3 and 7 shows that different sol gel solutions can be used as long as no—or only minor—chemical reactions between the matrix, fiber and sol gel solution occur. The equality of the measured bending strength does not, however, mean that both composite materials are equal in every respect. From FIG. 2, it follows that SiC fiber reinforced DURAN produced with a DURAN sol gel solution has a completely different stress strain behavior in comparison to when a SiO$_2$ sol gel solution is used (FIG. 1). The reasons for the different stress strain diagrams are not understood at the present. In any case, the material represented in FIG. 2 shows pronounced "plastic" behavior after the first fiber break.

While in the examples 1 to 8, data for unidirectional reinforced composites are quoted, example 9 shows data for bidirectional reinforced DURAN. The fibers are alternately aligned in 0° and 90° orientation. The bending strengths listed in the table were determined parallel to one fiber orientation. Although by this procedure only half of the fibers are loaded, the average strength decreases merely by 30% compared to a unidirectional reinforced glass to 519±74 MPa.

The upper application temperature of fiber reinforced DURAN is about 500° C. because the glass transition temperature of DURAN is 530° C. Higher application temperatures are achieved with the alkaline earth aluminosilicate glass SUPREMAX, the T$_g$ of which is 730° C.

In examples 10 to 13, the properties and process parameters of composites made of SiC fiber reinforced SUPREMAX are listed. It appears that composites with SUPREMAX as the matrix material achieve higher bending strengths than with DURAN. This is, above all, evident from the comparisons of example 3 with 12 and example 4 with 13, which in each case have approximately equal fiber volume loadings.

According to current knowledge, a chemical reaction between the fiber, matrix and sol gel solution is less responsible for the increase in bending strength and fracture toughness, than the higher expansion coefficient of SUPREMAX glass ($\alpha = 4.1 \times 10^{-6}$K$^{-1}$) compared to DURAN glass ($\alpha = 3.25 \times 10^{-6}$K$^{-1}$). SUPREMAX glass shrinks more strongly onto the fibers ($\alpha = 2.7 \times 10^{-6}$K$^{-1}$) than DURAN glass and by that adheres better.

Examples 10 and 11 show that even with relatively low fiber volume loadings of 36 or 37%, respectively, high values of bending strength are obtained. Optimization of the process parameters, especially of the pressure, has led to an obvious increase in bending strength in example 11 compared to example 10. Maximal fracture toughness values of 36 MPa$\times \sqrt{m}$ in example 13 go, as mentioned above, vastly beyond the prior art in which values of 27 MPa$\times \sqrt{m}$ are stated, although the fiber volume loading of 45% in example 13 is by 5% lower than that of the prior art.

Figure 3:
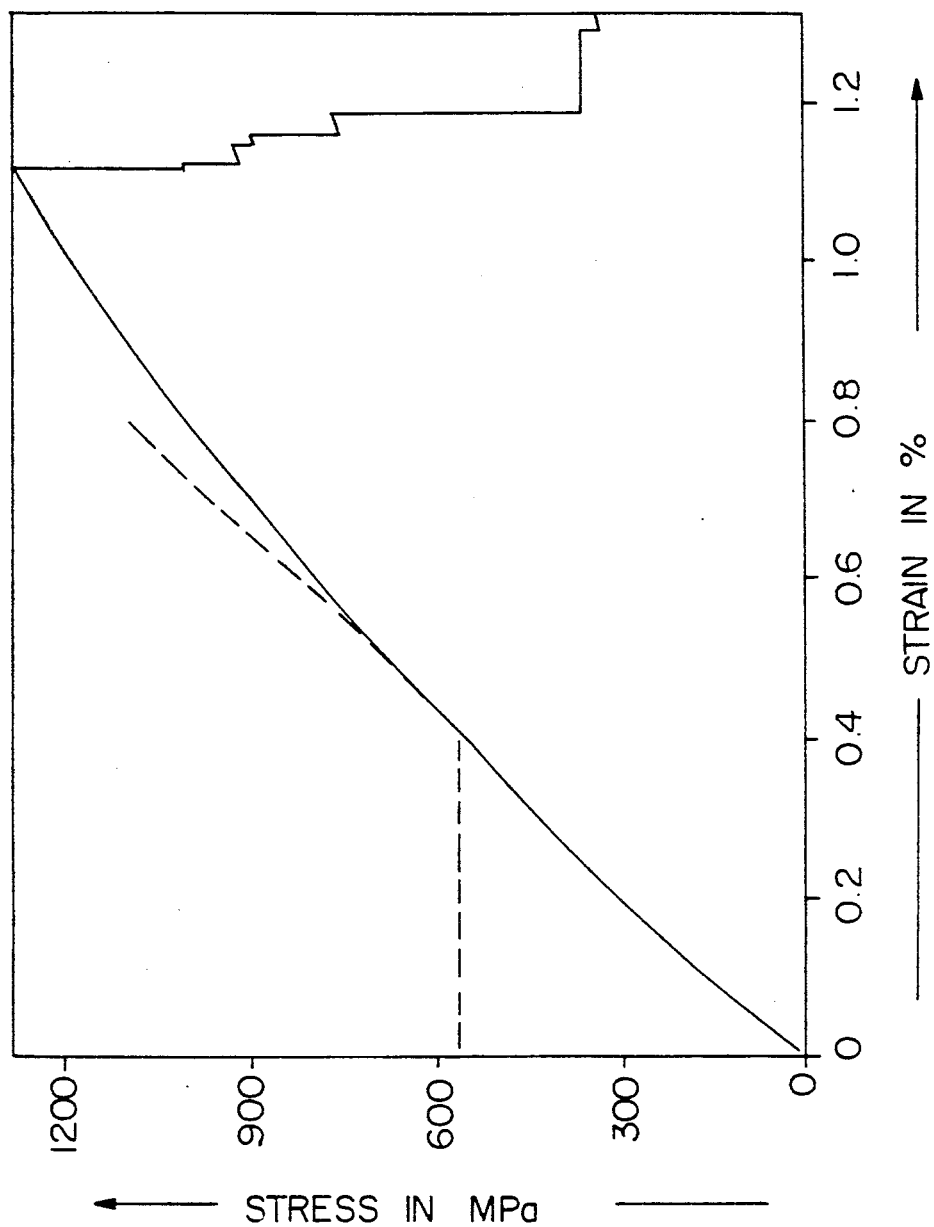
FIG. 3 shows the stress strain diagram of a SiC fiber reinforced alkaline earth aluminosilicate glass produced by use of a $SiO_2$-containing sol gel solution (SUPREMAX/SiC-composite; fiber-loading 45±2 vol. %)

The typical stress strain diagram of example 13 is shown in FIG. 3. The diagram shows the characteristic feature of fiber-reinforced glasses an initial linear functional relationship and then a slowly decreasing slope up to the maximal stress. At the maximal stress, the first fibers break. However, since not all fibers break at the same time, the stress strain curve shows a type of plastic behavior with respect to even higher strains.

In example 14, the alkaline earth aluminosilicate glass with the type number 8252 is used as matrix material.

That glass has compared to SUPREMAX a somewhat higher expansion coefficient ($\alpha = 4.5 \times 10^{-6} K^{-1}$) and approximately the same glass transition temperature ($T_g = 717°$ C.). Hence, the glass is considered to shrink more strongly on the fibers than SUPREMAX. The results for example 14 show that compared to SiC reinforced SUPREMAX no further increase in bending strength is achieved. The reason for this is, according to current knowledge, due to the substitution of $B_2O_3$ for $P_2O_5$ as well as the large difference in the expansion coefficients. The average strength value of 752 MPa is nevertheless very high and by it emphasizes that the inventive process allows a high flexibility in the selection of the matrix glasses.

Figure 4:
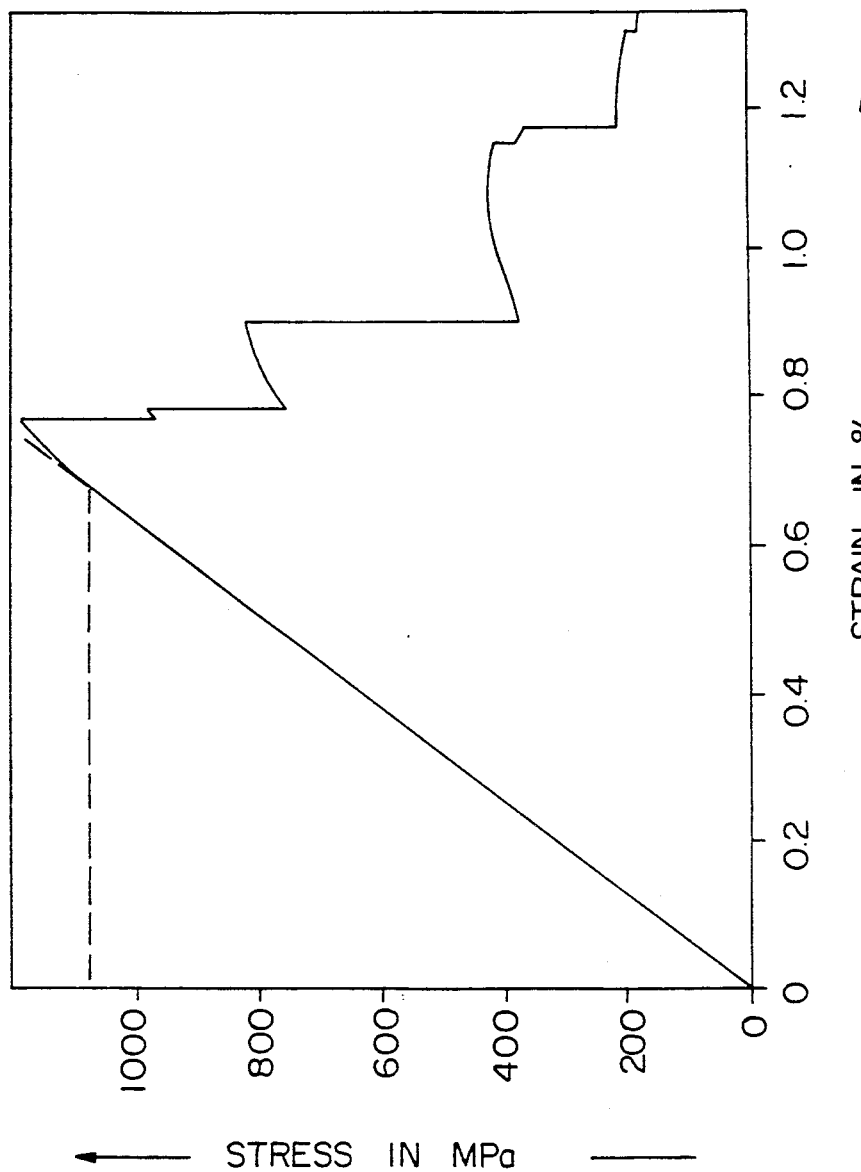
FIG. 4 shows the stress strain diagram of a C fiber reinforced borosilicate glass produced by use of a $SiO_2$-containing sol gel solution (DURAN/C (T800)-composite; fiber-loading 50±2 vol. %).

The examples 15 to 22 show results obtained for C fiber reinforced glasses. In usage of DURAN as matrix material, apparently higher bending strengths and fracture toughnesses are obtained as compared to SiC fiber reinforced DURAN. With increasing fiber volume loading in examples 15 to 17, average strength values of 774 MPa (30% fiber volume), 1129 MPa (35%), and 1210 MPa (42%) are observed. The corresponding fracture toughnesses are 20 MPa×$\sqrt{m}$, 25 MPa×$\sqrt{m}$, and 28 MPa×$\sqrt{m}$. As in the case of SiC fiber reinforced DURAN, the increase of the fiber volume loading up to 50% in example 18 of C fiber reinforced DURAN also does not lead to a further increase in bending strength. According to current knowledge, this behavior is due to the special winding procedure. On the other hand, the increase of the fiber volume loading entails a marked increase in fracture toughness up to average values of 35 MPa×$\sqrt{m}$. The change from the C fiber T 800 (example 17) to T 1000 (example 19) leads again to a slight increase in strength and fracture toughness. A characteristic stress strain diagram with respect to example 18 is shown in FIG. 4.

Composites made of C fiber reinforced SUPREMAX are distinguished with respect to the mechanical properties mentioned above by lower values, example 20, than the SiC fiber reinforced composites, example 12. However, in using the $B_2O_3$-containing alkaline earth aluminosilicate glass with the type number 8252 as matrix material, improved properties result compared to the C fiber reinforced composites, if the C fiber T 1000 is used. In example 22, average strength values of 1148±71 MPa are achieved.

The examples 23 to 27 show the results for SiC fiber reinforced glass ceramics. Solely starting glasses for cordierite glass ceramics were used as matrix material. Example 24 shows that the production of SiC fiber reinforced cordierite glass ceramics raises problems. The average strength of 333 MPa is indeed markedly higher than that of pure cordierite glass ceramic (approximately 100 MPa), however, the value is markedly lower than those of the above-mentioned fiber reinforced glasses. One of the reasons for the relatively low strength values is the use of four point transverse bending tests for the determination of the bending strength, because from experience four point bending strengths are lower than three point bending strengths. Furthermore, it appears that in carefully controlling the process parameters, further improvements in the properties can be achieved. This is shown by example 23, where at a fiber volume loading of 27% average bending strengths of 656 MPa are reached. Using fiber volume loadings of 51% and by increasing the pressure from 5 MPa to 10 MPa, average strength values of 751 MPa are obtained (example 25). These are excellent values with respect to fiber reinforced stoichiometric cordierite. Also, the average fracture toughness of 19 MPa×$\sqrt{m}$ in example 24 is a superior improvement as compared to the monolithic material.

Example 26 shows that, in adding 3 wt. % BaO to a stoichiometric cordierite and at a fiber volume loading of 34%, average strengths of 803 MPa and average fracture toughness of 24 MPa×$\sqrt{m}$ are achieved. These cordierite composites clearly excel the currently known prior art.

Finally, in example 27 the stoichiometric cordierite was modified by 3.5 wt. % $TiO_2$. When using a $TiO_2$-containing matrix, it is to be expected that a chemical reaction between the SiC fiber and the $TiO_2$ in the matrix takes place, as described in the U.S. Pat. No. 4,485,179. That effect appears also when using a $TiO_2$-containing sol gel solution in the production of a SiC fiber reinforced DURAN glass, as example 8 clearly demonstrates. In that example the strength values drop due to the reactive sol gel layer, to values which are comparable to those exhibited by the pure matrix. However, according to the inventive process in the case of example 27, it is to be expected that this reaction is prevented by coating each matrix grain as well as the SiC fibers with the $TiO_2$-free sol gel solution layer which during polycondensation forms a $SiO_2$ layer. This is confirmed by the examples. The average strengths achieved in example 27 amount to 400 MPa and, thus, do not suggest a degradation of the fiber. That in this example the strength of, for example, example 23 has not been obtained may have several reasons:

a) the achieved values date from the duty factor in which the process parameters have not been sufficiently accurately controlled;

b) only a few tests have been performed without optimization of the process parameters temperature, time and pressure; and c) it is to be expected that $TiO_2$ changes the crystallization—and therewith the densification behavior of the glass GM 30870.

TABLE

Composite combinations and their properties

| composite data | Example |  |  |  |  |  |  |  |  |  |
|---|---|---|---|---|---|---|---|---|---|---|
|  | 1 | 2 | 3 | 4 | 5 | 6 | 7 | 8 | 9 | 10 |
| matrix material | DURAN | = | = | = | = | = | = | = | = | SUPREMAX |
| type of fiber | SiC | = | = | = | = | = | = | = | = | SiC |
| sol gel solution | $SiO_2$ | = | = | = | = | none | DURAN | $TiO_2$ | $SiO_2$ | $SiO_2$ |
| fiber volume loading in % | 42 | = | = | 48 | 54 | 42 | 40 | 42 | 40 | 37 |
| pressing temperature in °C. | 1200 | = | 1265 | 1250 | 1260 | 1270 | 1255 | 1270 | 1260 | 1250 |
| pressing time in min. | 5 | = | = | = | = | = | = | = | = | 5 |
| pressure | 10 | = | = | = | = | = | = | = | = | 5 |

TABLE-continued

Composite combinations and their properties

| | | | | | | | | | | |
|---|---|---|---|---|---|---|---|---|---|---|
| in MPa | | | | | | | | | | |
| test temperature in °C | 20 | 600 | 20 | = | = | = | = | = | = | 20 |
| bending strength in MPa | 743 ± 42 | 764 ± 11 | 752 ± 81 | 840 ± 81 | 749 ± 35 | 676 ± 127 | 772 ± 72 | 104 ± 71 | 519 ± 74 | 655 ± 32 |
| fracture toughness in MPa √m | | | 20 ± 1 | 18 ± 2 | 25 ± 2 | | | | | |
| remarks | 4 point bending strength | | | | | * | | ** bidirectional reinforcement | | 4 point bending strength |

| composite data | Example | | | | | | | | |
|---|---|---|---|---|---|---|---|---|---|
| | 11 | 12 | 13 | 14 | 15 | 16 | 17 | 18 | 19 |
| matrix material | = | = | = | 8252 | DURAN | = | = | = | = |
| type of fiber | = | = | = | = | C/T800 | = | = | = | C/T1000 |
| sol gel solution | = | = | = | = | = | = | = | = | = |
| fiber volume loading in % | 36 | 41 | 45 | 40 | 30 | 35 | 42 | 50 | 42 |
| pressing temperature in °C | 1235 | 1200 | 1175 | 1260 | 1250 | 1250 | 1240 | 1250 | 1240 |
| pressing time in min. | = | = | = | = | = | = | = | = | = |
| pressure in MPa | 10 | = | = | = | 8 | 10 | = | = | = |
| test temperature in °C | 20 | 20 | 20 | 20 | 20 | 20 | 20 | 20 | 20 |
| bending strength in MPa | 845 ± 27 | 950 ± 41 | 1222 ± 74 | 752 ± 50 | 774 ± 140 | 1129 ± 161 | 1210 ± 62 | 1164 ± 92 | 1287 ± 41 |
| fracture toughness in MPa √m | 25 ± 5 | 26 ± 4 | 36 ± 7 | | 20 ± 3 | 25 ± 6 | 28 ± 3 | 35 ± 4 | 30 ± 6 |
| remarks | | | | | | | | | |

| composite data | Example | | | | | | | |
|---|---|---|---|---|---|---|---|---|
| | 20 | 21 | 22 | 23 | 24 | 25 | 26 | 27 |
| matrix material | SUPREMAX | 8252 | = | GM30870 | = | = | GM30870 +3 wt % BaO | GM30870 +3.5 wt % Ti |
| type of fiber | = | C/T800 | C/T1000 | SiC | = | = | = | = |
| sol gel solution | = | SiO₂ | = | = | = | = | = | = |
| fiber volume loading in % | 42 | 42 | = | 27 | 51 | = | 34 | 32 |
| pressing temperature in °C | 1190 | 1210 | 1215 | 1300 | 1310 | = | 1315 | 1350 |
| pressing time in min. | = | 5 | = | = | = | = | = | = |
| pressure in MPa | = | 10 | = | 2 | 5 | 10 | = | 5 |
| test temperature in °C | = | 20 | = | = | = | = | = | = |
| bending strength in MPa | 810 ± 46 | 768 ± 81 | 1148 ± 71 | 656 ± 122 | 333 ± 29 | 751 ± 60 | 803 ± 51 | 400 |
| fracture toughness in MPa √m | 22 ± 5 | | 19 ± 6 | | 19 | | 24 | |
| remarks | | | | 4 point bending strength | | | | |

*method according to prior art
**not disclosed by the present invention

What is claimed is:

1. A process for manufacturing fiber reinforced composites made of inorganic sinterable material and inorganic fibers comprising the steps of:
    passing the inorganic fibers continuously through a fluidized liquid suspension of inorganic sinterable powder;
    winding the resultant fibers moistened with the suspension one upon the other in layers;
    drying, thus obtaining a prepeg; and
    hot pressing the prepeg;
    wherein said suspension also contains, to promote adhesion between the fibers and the inorganic material, a solution of at least one metal alkoxide, which solution already comprises products of hydrolysis as well as their polycondensation products, and
    wherein said at least one metal alkoxide is completely hydrolyzed on the fiber and the inorganic material, and the products of hydrolysis are polycondensated, whereby surface layers are formed on the fibers and the inorganic material which facilitate, due to their high reactivity, the sintering process and hot pressing, and also act as a reaction barrier between fiber and inorganic material.

2. A process according to claim 1, wherein said inorganic fibers are selected from the group consisting of SiC-, $Si_3N_4$, $Al_2O_3$-, $ZrO_2$-, $SiO_2$ and C-fibers, and combinations thereof.

3. A process according to claim 2, wherein said inorganic fibers further contain at least one element of the group consisting of Si, Ti, Zr, Al, C, O and N as an additional component.

4. A process according to claim 1, wherein said metal alkoxide is an alkoxide of the elements of Groups IA-IVA and Groups IVB and VB of the periodic table or combinations thereof.

5. A process according to claim 4, wherein said metal alkoxide is a mixture of at least one silicon alkoxide and one or more of the other alkoxides.

6. A process according to claim 1, wherein said metal alkoxide is at least one silicon alkoxide.

7. A process according to claim 1 wherein an aqueous acid is used as solvent for the solution of at least one metal alkoxide.

8. A process according to claim 7, wherein a mixture of distilled water and concentrated acetic acid in a ratio 1:1–10:1 is used as aqueous acid.

9. A process according to claim 7 wherein at least one additional solvent is added to the acid solution of the metal alkoxide to control the degree of dilution.

10. A process according to claim 9, wherein said additional solvent is selected from the group consisting of methanol, ethanol, n-propanol, i-propanol, n-butanol, acetone, methyl ethyl ketone, methyl acetate, ethyl acetate and butyl acetate.

11. A process according to claim 1, wherein said inorganic sinterable material is a silicate powder.

12. A process according to claim 11, wherein said silicate powder comprises at least one glass.

13. A process according to claim 12, wherein said glass is selected from the group consisting of borosilicate glass, alkaline earth aluminosilicate glass, $B_2O_3$-containing alkaline earth aluminosilicate glass, $P_2O_5$-containing alkaline earth aluminosilicate glass, and combinations thereof.

14. A process according to claim 12, wherein said glass is at least one precursor glass of glass ceramics.

15. A process according to claim 14, wherein said glass is at least one precursor glass of cordierite-containing glass ceramics.

16. A process according to claim 11, wherein said powder is a powder of at least one glass ceramic.

17. A process according to claim 1, wherein said inorganic sinterable material is added to the solution in such an amount that the weight ratio of inorganic sinterable material and solution is in the range of 1:5–1:1.

18. A process according to claim 1, wherein hot pressing is performed at a temperature of 1000° to 1600° C. and at a pressure of 2 to 20 MPa.

19. A process according to claim 1, wherein hot pressing is performed under vacuum or under an inert gas atmosphere.

20. A process according to claim 14, wherein ceramizing of the precursor glass occurs simultaneously with hot pressing.

21. A process according to claim 14, wherein ceramizing of said precursor glass is performed after hot pressing.

22. A process according to claim 4, wherein said metal alkoxide is selected from the group consisting of the alkoxides of Na, K, Mg, Ca, Ba, Al, Si, Ti, Zr, Nb, Hf, Ta, and combinations thereof.

23. A process according to claim 1, wherein said inorganic fibers are mullite-fibers or a combination of mullite-fibers and at least one of the fibers selected from the group consisting of SiC-, $Si_3N_4$-, $Al_2O_3$-, $ZrO_2$-, $SiO_2$-, and C-fibers.

24. A process according to claim 1, wherein the resultant composite has a bending strength greater than or equal to 304 MPa.

25. A process according to claim 1, wherein the resultant composite has a bending strength greater than or equal to 435 MPa.

26. A process according to claim 1, wherein the resultant composite has a fracture toughness greater than or equal to 13 $MPa \times \sqrt{m}$.

27. A process according to claim 1, wherein said suspension consists essentially of inorganic sinterable silicate powder and said solution of at least one metal alkoxide, said solution containing products of hydrolysis and polycondensation.

28. A process according to claim 1, wherein said suspension consists of inorganic sinterable silicate powder and said solution of at least one metal alkoxide, said solution containing products of hydrolysis and polycondensation.

* * * * *